United States Patent [19]

Yanai et al.

[11] Patent Number: 4,541,499
[45] Date of Patent: Sep. 17, 1985

[54] VEHICULAR POWER STEERING HAVING STEERING EFFORT CONTROL SYSTEM

[75] Inventors: Tokiyoshi Yanai, Yokosuka; Hirotsugu Yamaguchi, Chigasaki; Masato Fukino, Yokohama; Yutaka Aoyama, Yokosuka, all of Japan

[73] Assignee: Nissan Motor Company, Ltd., Yokohama, Japan

[21] Appl. No.: 463,236

[22] Filed: Feb. 2, 1983

[30] Foreign Application Priority Data

Mar. 18, 1982 [JP] Japan ................................. 57-43391

[51] Int. Cl.$^4$ ............................................. B62D 5/06
[52] U.S. Cl. .................................................... 180/142
[58] Field of Search ................. 180/143, 142, 141, 132

[56] References Cited

U.S. PATENT DOCUMENTS

| | | | |
|---|---|---|---|
| 2,987,135 | 6/1961 | Harvey | 180/141 |
| 2,990,902 | 6/1961 | Cataldo | 180/142 X |
| 3,692,137 | 9/1972 | Inoue | 180/142 |
| 3,882,954 | 5/1975 | Inoue | 180/143 |
| 3,897,846 | 8/1975 | Inoue | 180/142 |
| 4,047,728 | 9/1977 | Takahashi et al. | 180/141 |
| 4,071,109 | 1/1978 | Ezoe | 180/143 |
| 4,119,172 | 10/1978 | Yanagishima et al. | 180/142 X |
| 4,274,504 | 6/1981 | Kawabata et al. | 180/143 |
| 4,300,650 | 11/1981 | Weber | 180/143 X |
| 4,392,540 | 7/1983 | Michio et al. | 180/142 |
| 4,418,779 | 12/1983 | Nakayama et al. | 180/141 |
| 4,473,128 | 9/1984 | Nakayama et al. | 180/142 |

FOREIGN PATENT DOCUMENTS

| | | | |
|---|---|---|---|
| 0071909 | 2/1983 | European Pat. Off. . | |
| 2356835 | 7/1974 | Fed. Rep. of Germany | 180/143 |
| 2412337 | 10/1974 | Fed. Rep. of Germany | 180/143 |
| 52-11531 | 1/1977 | Japan | 180/143 |
| 58-71262 | 4/1983 | Japan . | |
| 1379606 | 1/1975 | United Kingdom | 180/141 |
| 1392079 | 4/1975 | United Kingdom | 180/143 |
| 2035931 | 6/1980 | United Kingdom . | |

OTHER PUBLICATIONS

F. J. Adams, "Automotive Power Steering 'Feel'", Proc. Instn. Mech. Engrs., vol. 195, pp. 29–36 (Mar. 1981).

Primary Examiner—John A. Pekar
Attorney, Agent, or Firm—Lane, Aitken and Kananen

[57] ABSTRACT

A vehicular power steering system is provided with a steering effort control system which controls the degree of power assistance by controlling the supply of hydraulic fluid to the hydraulic power actuator unit. The steering effort control system monitors the speed of the vehicle and the angular velocity of the steering wheel, and controls the quantity of the fluid supply in accordance with the monitored variables. The fluid supply quantity is determined so as to satisfy the following three conditions: (1) The steering must become heavier as the vehicle speed increases; (2) however, a sufficient amount of the fluid must be supplied even when the steering wheel is turned rapidly; and (3) the driver must be given a feel about the lateral acceleration of the vehicle during a turn.

4 Claims, 5 Drawing Figures

VEHICULAR POWER STEERING HAVING STEERING EFFORT CONTROL SYSTEM

BACKGROUND OF THE INVENTION

The present invention relates to a vehicular power steering system, and more specifically to power steering systems equipped with means for controlling steering effort.

In general, resistance to steering decreases as the speed of a vehicle increases. On the other hand, the lateral acceleration of a vehicle during a turn increases as the vehicle speed increases. At higher speeds, therefore, a power steering system tends to make the steering too light and unstable. Therefore, power steering systems are often equipped with steering effort control means which provides the full power assistance for parking but reduces the degree of assistance at higher speeds by reducing the supply of hydraulic fluid to the power cylinder as the vehicle speed increases. In this case, however, there is a possibility that, when the steering wheel is turned at a high angular velocity, the fluid supply becomes short of the quantity required by an increase of the power chamber volume due to movement of the power piston of the power cylinder. Insufficient fluid supply makes the power cylinder inoperative temporarily, so that the steering becomes abruptly heavy. This condition is very dangerous. Furthermore, in conventional steering effort control systems, the lateral acceleration of a vehicle is not taken into account properly. When the driver begins to turn the steering wheel, he is not provided with a feel in the form of steering effort change that the lateral acceleration is going to increase, so that an unskilled driver tends to make an error in vehicle control by turning the steering wheel excessively.

It is an object of the present invention to provide a vehicular power steering system having a steering effort control system which is capable of controlling properly the degree of power assistance in accordance with the speed of the vehicle, the angular velocity of the steering wheel, and the lateral acceleration of the vehicle.

BRIEF SUMMARY OF THE INVENTION

According to the present invention, the power steering system comprises a steering mechanism including a steering wheel, hydraulic actuator means having a power cylinder for providing power assistance for the steering mechanism, hydraulic fluid supplying means having a fluid pump, and servo valve means, connected with the fluid pump through a supply fluid conduit and a return fluid conduit, for controlling the fluid flow from the pump and introducing a fluid pressure to the power cylinder in accordance with movement of the steering wheel. The power steering system of the present invention further comprises bypass control valve means, vehicle speed sensing means, angular velocity sensing means, and control means. The bypass control valve means is disposed in a bypass fluid conduit connected between the supply fluid conduit and the return fluid conduit to bypass the servo valve means, and controls the rate of fluid flow through the bypass conduit thereby to control the degree of power assistance by controlling the fluid supply to the servo valve means. The vehicle speed sensing means senses the speed of the vehicle and the angular velocity sensing means senses the angular velocity of the steering wheel. The control means is connected with the vehicle speed sensing means and the angular velocity sensing means, and produces a control signal which is sent to the bypass valve means to control the bypass flow rate in accordance with sensed vehicle speed and the sensed angular velocity of the steering wheel, in such a manner that the bypass flow rate is controlled to be equal to a basic quantity which increases as the sensed vehicle speed increases while the bypass flow rate is decreased from the basic quantity to a modified quantity in accordance with the sensed angular velocity of the steering wheel, so as to prevent the fluid supply to the servo valve means from decreasing below a required quantity which is required by a volume increase of a power chamber of the power cylinder due to a movement of a power piston of the power cylinder. The control means further controls the bypass control valve in such a manner that the bypass flow rate is increased by a correction quantity which is determined in accordance with the sensed vehicle speed and the sensed angular velocity.

Preferably, the control means produces the control signal having such a value that the bypass flow rate is controlled to be equal to the algebraic sum of the basic quantity which is a function of the vehicle speed, minus the required quantity which is a function of the angular velocity of the steering wheel, plus the correction quantity which is a function of the vehicle speed and the angular velocity of the steering wheel.

DETAILED DESCRIPTION OF THE INVENTION

Figure 1:
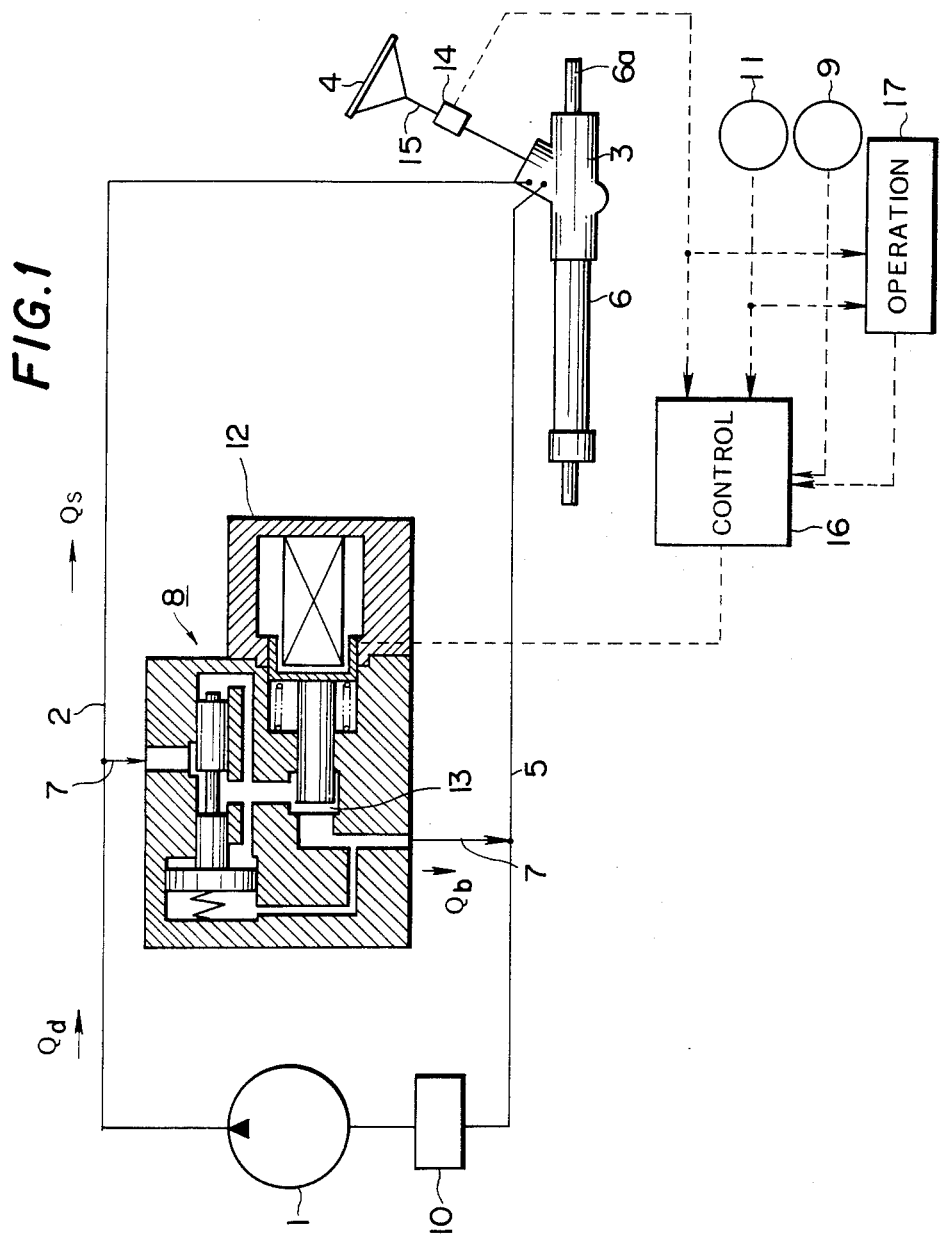
FIG. 1 is a schematic illustration showing one embodiment of the power steering system according to the present invention.

In one embodiment of the invention shown in FIG. 1, a fluid pump 1 of a constant flow rate type draws a hydraulic fluid from a fluid reservoir 10 and supplies it at a constant flow rate through a supply conduit 2 to a servo valve unit 3 associated with a power cylinder 6. The fluid returns through a return conduit 5 to the reservoir 10. The servo valve unit 3 is of an open-center type in which, in the straight ahead position, fluid passes through the open center of the servo valve and is routed back to the pump reservoir 10. A bypass conduit 7 allows a portion of the fluid flowing through the supply conduit 2 toward the servo valve unit 3 to bypass the servo valve unit 3 and to return directly to the reservoir 10. In the bypass conduit 7, there is provided a bypass flow rate control valve 8 of a fluid pressure compensation type. The bypass flow rate control valve 8 has a variable orifice 13, whose opening degree is varied by a servo motor or plunger 12. The bypass valve 8 has a spool which is arranged to maintain the pressure difference between the both sides of the orifice 13 constant. Accordingly, the rate of a fluid flow through the bypass conduit 7 is determined by the opening degree of the variable orifice 13, and is not influenced by fluid pressure changes in the supply conduit 2. A numeral 6a shows a piston rod of the power cylinder 6. Both ends of the piston rod 6a are connected, respectively, with ends of right and left tie rods (not shown) which are linked with right and left steerable road wheels, respectively.

There is provided a control circuit 16 which controls the opening degree of the variable orifice 13 of the bypass flow rate control valve 8 by controlling a driving current supplied to the servo motor 12. The control circuit 16 receives input signals from a vehicle speed sensor 11 for sensing the speed of the vehicle and an angular velocity sensor 14 which is disposed at a steering shaft portion 15 of a steering wheel 4 and senses the angular velocity of the steering wheel 4. The control circuit 16 further receives an input signal from an operation circuit 17. The control circuit controls the flow rate of the bypass conduit 7 in accordance with these input signals. A numeral 9 refers to a power source for the control circuit 16.

The operation circuit 17 receives, as input signals, the output signals of the vehicle speed sensor 11 and the angular velocity sensor 14. From these signals, the operation circuit 17 determines a correction flow rate quantity corresponding to an increase of the acceleration of the vehicle in the lateral direction which is caused in accordance with the vehicle speed and the angular velocity of the steering wheel. Then, the operation circuit 17 produces an output signal indicative of the determined correction quantity and sends it to the control circuit 16.

Upon receipt of the output signals of the operation circuit 17, the control circuit 16 produces an output control signal to be sent to the servo motor 12 of the bypass valve 8 so that the bypass flow rate is maintained equal to a difference remaining after the correction flow rate quantity determined by the operation circuit is substracted from the flow rate quantity determined in accordance with the output signals of the vehicle speed sensor 11 and the angular velocity sensor 14.

The thus constructed power steering system is operated as follows:

The fluid pump 1 discharges a hydraulic fluid into the supply conduit 2 at a constant flow rate Qd. A portion of the fluid coming from the fluid pump 1 is allowed to flow through the bypass conduit 7 at a flow rate Qb. The remaining portion of the fluid is supplied to the servo valve unit 3 at a flow rate Qs. That is, the supplied flow rate Qs is equal to the difference obtained by subtracting the bypass flow rate Qd, that is, from the discharged flow rate Qd; Qs=Qd−Qb.

The bypass flow rate Qb is controlled by the bypass control valve 8 disposed in the bypass conduit 7. The bypass control valve is controlled by the control circuit 16. The control circuit 16, thus, controls the supplied flow rate by controlling the bypass flow rate.

Figure 2:
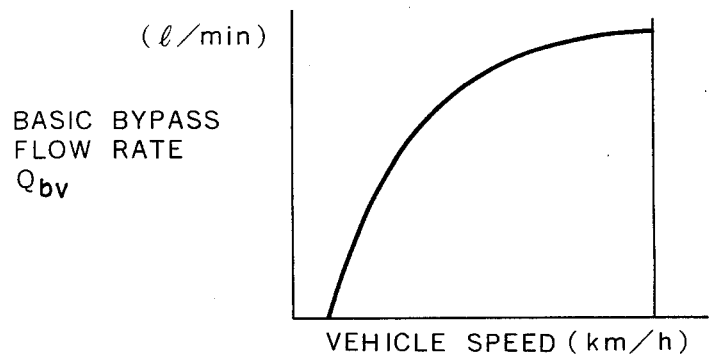
FIG. 2 is a graph showing the relationship between the bypass flow rate and the vehicle speed.

In order to make the steering adequately heavy at high vehicle speeds, the control circuit 16 controls the bypass control valve 8 so as to decrease the supplied flow rate Qs as the vehicle speed increases. To do this, the control circuit 16 increases the bypass flow rate Qb in accordance with the vehicle speed signal of the vehicle speed sensor 11. This control action is shown in FIG. 2. In FIG. 2, a basic quantity Qbv of the bypass flow rate which is dependent solely on the vehicle speed, is increased with an increase of the vehicle speed.

The control circuit 16 further controls the bypass control valve 8 so as to prevent a lack of the fluid supply to the servo valve unit 3 due to a rapid turn of the steering wheel. In this case, the control circuit 16 decreases the bypass flow rate to increase the supplied flow rate in accordance with the angular velocity signal sent from the steering wheel angular velocity sensor 14. In this control action, the supplied flow rate Qs is increased (that is, the bypass flow rate Qb is decreased,) by a required quantity Qr which is a flow rate corresponding to the rate of change of power chamber volume of the power cylinder 6 caused by a movement of the power piston. This rate of chamber volume change of the power cylinder is known from the effective area of the power piston and the speed of the piston movement. The speed of the piston is determined by the angular velocity of the steering wheel. The relationship between the required quantity Qr and the angular velocity of the steering wheel is shown by a solid line 19 in FIG. 3.

Figure 3:
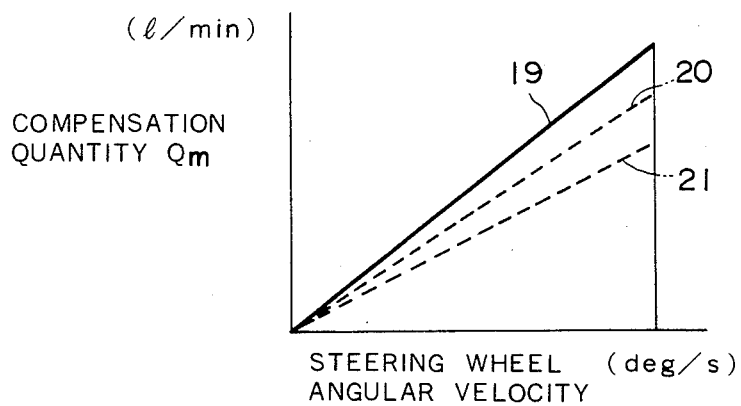
FIG. 3 is a graph showing the relationship between the compensation quantity and the angular velocity of the steering wheel.

The operation circuit 17 receives the vehicle speed signal of the vehicle speed sensor 11 and the angular velocity signal of the steering wheel angular velocity sensor 14, and determines a correction quantity Qc in accordance with the vehicle speed and the angular velocity of the steering wheel. The control circuit 16 receives the output signal of the operation circuit 17 indicative of the determined correction quantity Qc, and determines a compensation quantity Qm which is given by Qm=Qr−Qc. The characteristic of the compensation quantity Qm is shown in FIG. 3. The compensation quantity Qm is changed from the solid line 19 to a broken line 20 and to a broken line 21 as the vehicle speed increases. The correction quantity Qc is shown as the difference between the solid line 19 and the broken line 20 or 21. The correction quantity Qc is not greater than the required quantity Qr. That is, the compensation quantity Qm is equal to or greater than zero.

Finally, the control circuit 16 controls the bypass control valve 8 so that the bypass flow rate Qb is;

$$Qb = Qbv - Qm$$
$$= Qbv - Qr + Qc.$$

As a result, the supplied quantity Qs is given by $$Qs = Qd - Qb$$
$$= Qd - Qbv + Qr - Qc.$$

In this way, the fluid supply to the servo valve unit 3 is decreased as the vehicle speed increases, and at the same time, the fluid supply is increased by the compensation quantity Qm in accordance with the angular velocity of the steering wheel so that the fluid supply is always sufficient to meet the demand caused by movement of the piston of the power cylinder. Accordingly, this power steering system can eliminate the possibility that the steering becomes abruptly heavy because of a lack of the fluid supply when the steering wheel is turned rapidly. Furthermore, the compensation quantity Qm is corrected in accordance with the vehicle speed and the angular velocity of the steering wheel so as to let the driver feel an increase of the lateral acceleration of the vehicle in terms of a change of the steering effort level. Accordingly, this power steering system can eliminate the possibility of the driver's turning the steering wheel too much.

Figure 4:
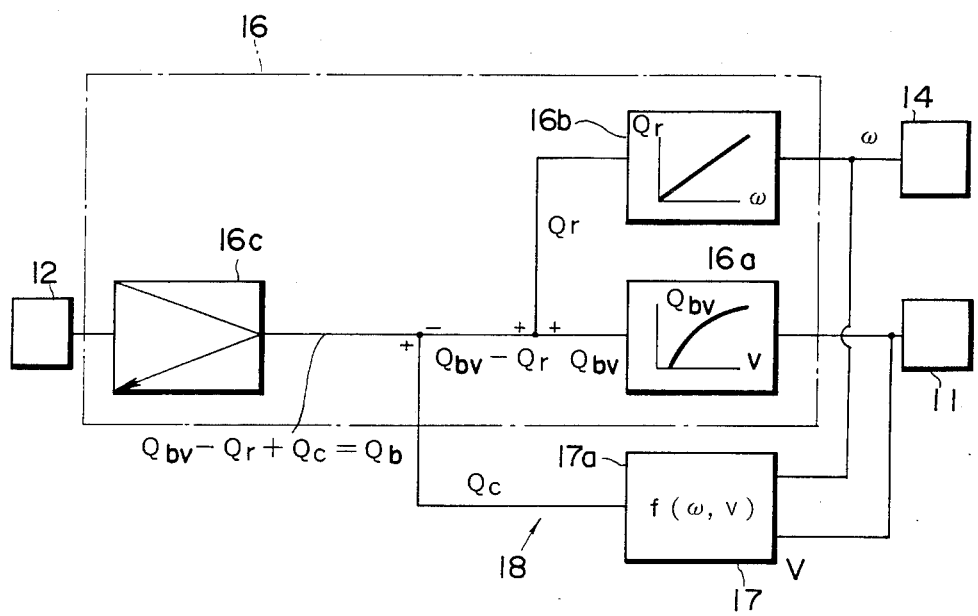
FIG. 4 is a block diagram showing one example of the control means of the present invention.

FIG. 4 shows a concrete example of control means 18 comprising the control circuit 16 and the operation circuit 17. A first circuit 16a produces an output signal indicative of the vehicle speed dependent basic bypass flow rate quantity Qbv which is a function of the vehicle speed. A second circuit 16b produces an output signal indicative of the required quantity Qr which is a function of the angular velocity of the steering wheel. A circuit 17a of the operation circuit 17 produces an output signal in accordance with an increase of the lateral acceleration of the vehicle. The output signal of the circuit 17a is indicative of the correction quantity Qc which is a function of the vehicle speed and the angular velocity of the steering wheel. In FIG. 4, a letter $\omega$ represents the angular velocity of the steering wheel and a letter V the vehicle speed. A numeral 16c is a current amplifier, which receives an input signal current indicative of the bypass flow rate quantity Qb, obtained by the output signals of the circuits 16a, 16b and 17a, and amplifies the input current.

The control means 18 may be constructed by using storage means storing a table of values of the control signal. In this case, a micro computer or other means accesses a desired memory location in accordance with the vehicle speed and the angular velocity of the steering wheel, and picks up a value in that location for use in the bypass flow control. Such a method may be employed to determine one or more of the quantities Qb, Qbv, Qr and Qc.

Figure 5:
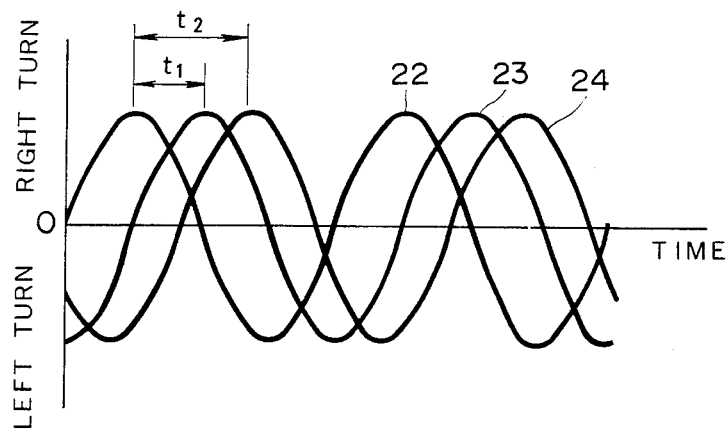
FIG. 5 is a graph showing the steering wheel angular velocity, the steering wheel angle and the lateral acceleration varying with time during a slalom course driving.

When a vehicle is running a slalom course, the steering wheel angular velocity, the steering wheel rotational angle and the lateral acceleration of the vehicle vary periodically as a function of time, as shown in FIG. 5. In FIG. 5, a curve 22 shows the steering wheel angular velocity, a curve 23 the steering wheel angle and a curve 24 the lateral acceleration of the vehicle. The steering wheel angle 23 is delayed by an amount of time t1 with respect to the steering wheel angular velocity 22, and the lateral acceleration 24 is delayed by an amount of time t2 which is greater than t1, with respect to the steering wheel angular velocity.

Thus, the steering effort control system according to the present invention can provide power assistance of an adequate degree which is adapted in accordance with increases of the speed of the vehicle and the angular velocity of the steering wheel. Especially, under operating conditions where both the vehicle speed and the steering wheel angular velocity are high, the steering effort can be adjusted to a suitably heavy level, so that even an unskilled driver can easily avoid a danger of an excessive turn of the steering wheel which would be incurred if the steering is too light.

The steering effort control system of the present invention does not give the driver an unnatural feeling during a slalom course driving. In general, it is preferable that the steering effort is increased in accordance with the lateral acceleration of the vehicle. As seen from FIG. 5, the lateral acceleration of the vehicle varies with a lag with respect to steering wheel movement. In one type of a steering effort control system, such as disclosed in Japanese Patent examined publication No. Sho 55-19792, the lateral acceleration of the vehicle is sensed by using a pendulum and the steering effort is controlled in accordance with the sensed lateral acceleration. In such a system, however, the lateral acceleration of the vehicle running a slalom course is increased in the middle of a handling to return the steering wheel to a straight ahead position, and accordingly the steering effort is increased at such a time. This gives the driver a very unnatural steering feeling. According to the present invention, the vehicle speed and the steering wheel angular velocity are sensed and the system controls the steering effort in accordance with the sensed variables, taking the lateral acceleration of the vehicle into consideration. Accordingly, the system of the present invention can provide a steering effort control which gives the driver a natural steering feeling without a lag with respect to steering wheel movement.

What is claimed is:

1. A vehicular power steering system comprising:
a steering mechanism including a steering wheel,
hydraulic actuator means having a power cylinder for transmitting mechanical work converted from hydraulic power to said steering mechanism for providing power assistance,
hydraulic fluid supplying means having a fluid pump,
servo valve means, connected with said fluid pump through a supply fluid conduit and a return fluid conduit, for controlling the fluid flow from said pump and introducing a fluid pressure to said power cylinder in accordance with movement of the steering wheel,
bypass control valve means, disposed in a bypass fluid conduit connected between said supply conduit and said return conduit to bypass said servo valve means, for controlling the rate of a fluid flow through said bypass conduit thereby to control the degree of power assistance by controlling the fluid supply to said servo valve means,
speed sensing means for sensing the speed of the vehicle,
angular velocity sensing means for sensing the angular velocity of the steering wheel, and
control means, connected with said vehicle speed sensing means and said angular velocity sensing means, for producing a control signal which is provided to said bypass control means to control the bypass flow rate in accordance with the sensed vehicle speed and the sensed angular velocity of the steering wheel, in such a manner that the bypass flow rate is controlled to be equal to the algebraic sum of a basic quantity which increases as the sensed vehicle speed increases minus a required quantity which is required by a volume increase of a power chamber of the power cylinder due to a movement of a power piston of the power cylinder and which is a function of the angular velocity of the steering wheel, plus a correction quantity which is determined in accordance with the sensed vehicle speed and the sensed angular velocity of the steering wheel.

2. A power steering system according to claim 1, wherein said control means comprises first means for determining the basic quantity in accordance with the vehicle speed, second means for determining the required quantity in accordance with the angular velocity of the steering wheel, third means for determining the correction quantity in accordance with the vehicle speed and the angular velocity of the steering wheel, and fourth means, connected with said first, second and third means, for determining said algebraic sum and producing the control signal having a value equal to said algebraic sum.

3. A power steering system according to claim 1, wherein said control means comprises storage means storing a table of values of said algebraic sum corresponding to the vehicle speed and the angular velocity of the steering wheel, and a micro-computer for obtaining a function value corresponding to the vehicle speed and the angular velocity of the steering wheel from the table.

4. A power steering system according to claim 1, wherein said correction quantity is equal to or smaller than said required quantity.

* * * * *